US010620927B2

(12) United States Patent
Axnix et al.

(10) Patent No.: US 10,620,927 B2
(45) Date of Patent: Apr. 14, 2020

(54) METHOD, ARRANGEMENT, COMPUTER PROGRAM PRODUCT AND DATA PROCESSING PROGRAM FOR DEPLOYING A SOFTWARE SERVICE

(75) Inventors: Christine Axnix, Boeblingen (DE); Gerhard Banzhaf, Boeblingen (DE); Michael Behrendt, Boeblingen (DE); Andreas Bieswanger, Boeblingen (DE); Gerd Breiter, Boeblingen (DE); Andrea Schmidt, Boeblingen (DE); Helmut H Weber, Boeblingen (DE); Friedemann Baitinger, Boeblingen (DE); Stefan Wirag, Boeblingen (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 2592 days.

(21) Appl. No.: 12/476,569

(22) Filed: Jun. 2, 2009

(65) Prior Publication Data
US 2009/0307685 A1 Dec. 10, 2009

(30) Foreign Application Priority Data
Jun. 6, 2008 (EP) .................................. 08157775

(51) Int. Cl.
*G06F 8/60* (2018.01)
(52) U.S. Cl.
CPC ..................................... *G06F 8/60* (2013.01)
(58) Field of Classification Search
CPC ........................................................ G06F 8/60

USPC .......................................................... 705/56
See application file for complete search history.

(56) References Cited

U.S. PATENT DOCUMENTS

| | | | | |
|---|---|---|---|---|
| 5,321,840 A | * | 6/1994 | Ahlin et al. | 717/178 |
| 5,365,587 A | * | 11/1994 | Campbell et al. | 713/183 |
| 5,564,040 A | * | 10/1996 | Kubala | 711/173 |
| 5,758,070 A | * | 5/1998 | Lawrence | 709/220 |
| 5,878,128 A | * | 3/1999 | Kantola | 379/230 |
| 5,982,899 A | * | 11/1999 | Probst | 713/1 |

(Continued)

OTHER PUBLICATIONS

Qi et al., Provisioning for Dynamic Instantiation of Community Services, IEEE Computer Society, all pages. (Year: 2008).*

(Continued)

*Primary Examiner* — Jacob C. Coppola
(74) *Attorney, Agent, or Firm* — Cantor Colburn LLP; Steven Chiu

(57) ABSTRACT

Deploying a software service. A defined software service offering is selected from a plurality of defined software service offerings. An instantiation order for deploying the selected defined software service offering on a corresponding computer system is generated. Each defined software service offering comprises a software service definition and at least one defined software policy. One selected from the group consisting of the software service definition, the software policy, and a combination thereof, provides a hardware configuration for the software service, a software configuration for the software service, and a managing policy for the software service. The instantiation order of the software service for execution on the computer system is created based on the hardware configuration, the software configuration and the managing policy.

7 Claims, 7 Drawing Sheets

(56) References Cited

U.S. PATENT DOCUMENTS

| | | | |
|---|---|---|---|
| 2002/0059456 A1* | 5/2002 | Ha | G06F 9/4411 709/246 |
| 2003/0120914 A1* | 6/2003 | Axnix et al. | 713/100 |
| 2004/0117311 A1* | 6/2004 | Agarwal et al. | 705/52 |
| 2004/0133793 A1* | 7/2004 | Ginter et al. | 713/193 |
| 2006/0015589 A1* | 1/2006 | Ang et al. | 709/220 |
| 2006/0101267 A1* | 5/2006 | Takamura et al. | 713/171 |
| 2006/0140370 A1* | 6/2006 | Agarwal et al. | 379/114.28 |
| 2006/0265713 A1* | 11/2006 | Depro et al. | 718/104 |
| 2006/0274722 A1* | 12/2006 | Polan et al. | 370/352 |
| 2008/0060080 A1* | 3/2008 | Lim | H04L 63/20 726/26 |

OTHER PUBLICATIONS z/OS MVS Planning: Workload Management, IBM Corporation, SA22-7602-14.

* cited by examiner

METHOD, ARRANGEMENT, COMPUTER PROGRAM PRODUCT AND DATA PROCESSING PROGRAM FOR DEPLOYING A SOFTWARE SERVICE

BACKGROUND

Field of the Invention

The present invention relates in general to utility computing, especially the area of deploying, managing, and metering Dynamic IT Service instances by Dynamic IT Service providers, and in particular to a method and an arrangement for deploying a software service. Still more particularly, the present invention relates to a data processing program and a computer program product for performing a method for deploying a software service.

Description of the Related Art

A dynamic infrastructure of a computer system like IBM System z is an infrastructure for provisioning and management of Dynamic IT Service system. The provisioning of a Dynamic IT Service system requires a set of hardware resources for the respective Dynamic IT Service components and a specification of the Dynamic IT Service system itself for later configuration. The management of provisioned Dynamic IT Service systems is done according to so-called service level agreements (SLAs) that describe, for instance, performance and also monetary goals.

The management and provisioning of a Dynamic IT Service system is offered from the provider to the consumer as a dynamic IT service in a subscription model. So-called offerings contain definitions of these services themselves together with the supported hardware and software configurations. An offering contains, for example, workload characteristics and service level agreements for a system type (e.g. CICS, IMS, SAP, z/OS, Linux for z, etc.), a usage type (e.g. test, development, production, etc.), a management type (e.g. non-automated/automated), etc. Offerings also define the set of provisioning and management actions as so-called orders defined for the offered service. The provisioning and management actions are defined as so-called build plans that need to be completed before execution. This allows for certain points of variability for the subscriber when subscribing to the offering with respect to the type of server or the concrete server instance used during provisioning. Offerings also define the set of available service level agreements.

As said, the subscribers complete the order templates and thus the points of variability by providing detailed configuration information about the "to-be-managed" Dynamic IT Service system. Furthermore they have to select the concrete hardware resources for the Dynamic IT Service system according to the offering.

The used dynamic infrastructure then instantiates, manages, and terminates the service based on orders. It is important to state that the current infrastructure does not prohibit out-of-band changes and manipulations of the deployed service beyond the predefined orders in the offering.

The underlying set of hardware resources, such as (virtual) servers, logical partitions etc. on which the components of a Dynamic IT Service system can be provisioned is kept in a so-called global IT resource pool. This Pool is discovered by the underlying provisioning system.

To create an instantiation order to instantiate a Dynamic IT Service system on the used dynamic infrastructure according to the specification in the offering, the dynamic infrastructure offers a registry containing offerings for the services. The subscriber selects the offering he wants to use from the registry using a graphical user interface, the concrete hardware resources according to the offering and specifies the concrete configuration data for the service. Having all the information selected, the dynamic infrastructure component order preparation processes the relevant information and creates the order that finally creates the service according to the specification and selected resources.

Disadvantage of the current approach is that a subscriber has to provide very detailed information about the target system representing the service.

BRIEF SUMMARY

The technical problem underlying the invention is to provide a method and an arrangement for deploying a software service, and to provide a data processing program and a computer program product to perform the method for deploying a software service, which are able to improve a usage of physical resources (e.g. server, storage, network) and to reduce skill requirements for IT infrastructure management.

The invention solves this problem by providing a method for deploying a software service having the features of claim 1, an arrangement for deploying a software service having the features of claim 16, a data processing program for performing a method for deploying a software service having the features of claim 19, and a computer program product causing a computer to perform a method for deploying a software service having the features of claim 20. Advantageous embodiments of the invention are mentioned in the sub claims.

Accordingly, in an embodiment of the present invention, a method for deploying a software service provides a set of selectable defined software service offerings, selects a defined software service offering, and creates an instantiation order for deploying the selected defined software service on a corresponding computer system, wherein each defined software service offering comprises a software service definition and at least one defined software policy, wherein the software service definition and/or the software policy provide a hardware configuration for the software service, a software configuration for the software service, and a managing policy for the software service, wherein the instantiation order of the software service for execution on the computer system is created based on the hardware configuration, the software configuration and the managing policy.

In further embodiments of the present invention, the defined software service offering is selected by a subscriber.

In further embodiments of the present invention, the at least one defined software policy contains logical service configuration information which is translated in a physical service configuration information for the software service.

In further embodiments of the present invention, the physical service configuration information comprises hardware resource and/or software resource and/or security information.

In further embodiments of the present invention, the information about software resources comprises information about software components required for each of the defined software services and resource requirements and/or high availability configuration of those software components.

In further embodiments of the present invention, the information about hardware resources comprise information about hardware components in a global resource pool, wherein the resource pool comprises at least one central electronic complex and/or at least one logical partition and/or at least one hard disk and/or at least one I/O-Network and/or at least two different processor types, wherein each processor type is priced differently and processes only one particular type of work.

In further embodiments of the present invention, software components for the selected software service are determined, and target hardware components from the global resource pool for the selected software are selected based on the service configuration information.

In further embodiments of the present invention, number and type of selected processors depend on an amount or type of workload to process.

In further embodiments of the present invention, a configuration of the at least one central electronic complex and/or the at least one logical partition is determined according to a required high availability configuration, wherein only one logical partition is selected, if low or no high availability is required, and several logical partitions distributed over multiple central electronic complexes are selected, if high availability is required.

In further embodiments of the present invention, the software policies are transformed into autonomic management policies.

In further embodiments of the present invention, an authentication mechanism for workload is selected based on said software policy to prevent the selected software service from being manipulated and/or tampered during its lifetime.

In further embodiments of the present invention, a signature on an application and/or on a number of transactions and/or users and/or on performance limits is generated defined by the software policy, wherein the application signature is written into a deployment description.

In further embodiments of the present invention, the authentication mechanism schedules at least one consistency checker agent, which can access the signatures and check for violations.

In further embodiments of the present invention, the at least one logical partition is instantiated on the at least one central electronic complex, when the instantiation order of the software service is executed on the computer system, wherein operating system images are installed in the at least one logical partition, the I/O-Network configuration is deployed, an information of the global resource pool is updated and corresponding system management components for workload management and/or high-availability management and/or authorization observation are installed.

In further embodiments of the present invention, accounting and authorization observation runtime components are configured according to the instantiation order.

In another embodiment of the present invention, an arrangement for deploying a software service comprises an offering registry block for providing a set of selectable defined software service offerings, a user interface block for selection of a defined software service offering, and means for creating an instantiation order for deploying said selected defined software service on a corresponding computer system, wherein the means for creating an instantiation order comprise a software service deployment manager block and a configuration repository block, wherein each defined software service offering of said offering registry block comprises a software service definition and at least one defined software policy, wherein the software service deployment manager block analyzes the software service definition and/or the software policy using the configuration repository block to provide a hardware configuration for the software service, a software configuration for the software service, and a managing policy for the software service according to best practice, wherein the software service deployment manager block creates the instantiation order of the software service for execution on said computer system based on the hardware configuration, the software configuration and the managing policy.

In further embodiments of the present invention, the service deployment manager block further comprises a workload deployment block, which translates a logical service configuration information, which is contained in the at least one defined software policy, in a physical service configuration information for the software service and selects target hardware components from a global resource pool for the selected software based on the service configuration information, a service level agreement translation block, which transforms the software policies into autonomic management policies, a workload authentication block, which selects an authentication mechanism for workload based on the software policy to prevent the selected software service from being manipulated and/or tampered during its lifetime, and a metering data collection and/or aggregation block, which receives metering data from a resource measurement block and/or system hardware and aggregates the data during runtime of the software service.

In further embodiments of the present invention, manageable resource blocks are used to realize an authorization observation and accounting as part of the deployed software service, wherein additional manageable resource blocks are used to extend capabilities of a given manageable resource block.

In another embodiment of the present invention, a data processing program for execution in a data processing system comprises software code portions for performing the method for deploying a software service when the program is run on the data processing system.

In just another embodiment of the present invention, a computer program product stored on a computer-usable medium comprises computer-readable program means for causing a computer to perform the method for deploying a software service when the program is run on the computer.

All in all, embodiments of the invention disclosed herein comprising a software service deployment manager with a configuration repository with best practice configurations enable the automatic mapping of high level logical configurations and software goals into physical configuration information, i.e. hardware, software, user accounts, and policies. This optimizes the usage of physical resources (i.e. servers, storage, networks) and reduces the skills needed for IT infrastructure management. The introductions of software service certificates provides for asset protection and security, since instantiated software services cannot be modified unauthorized and software services running on the same server are protected against each other.

The above, as well as additional purposes, features, and advantages of the present invention will become apparent in the following detailed written description.

BRIEF DESCRIPTION OF THE SEVERAL VIEWS OF THE DRAWINGS

A preferred embodiment of the invention, as described in detail below, is shown in the drawings, in which.

DETAILED DESCRIPTION

Figure 1:
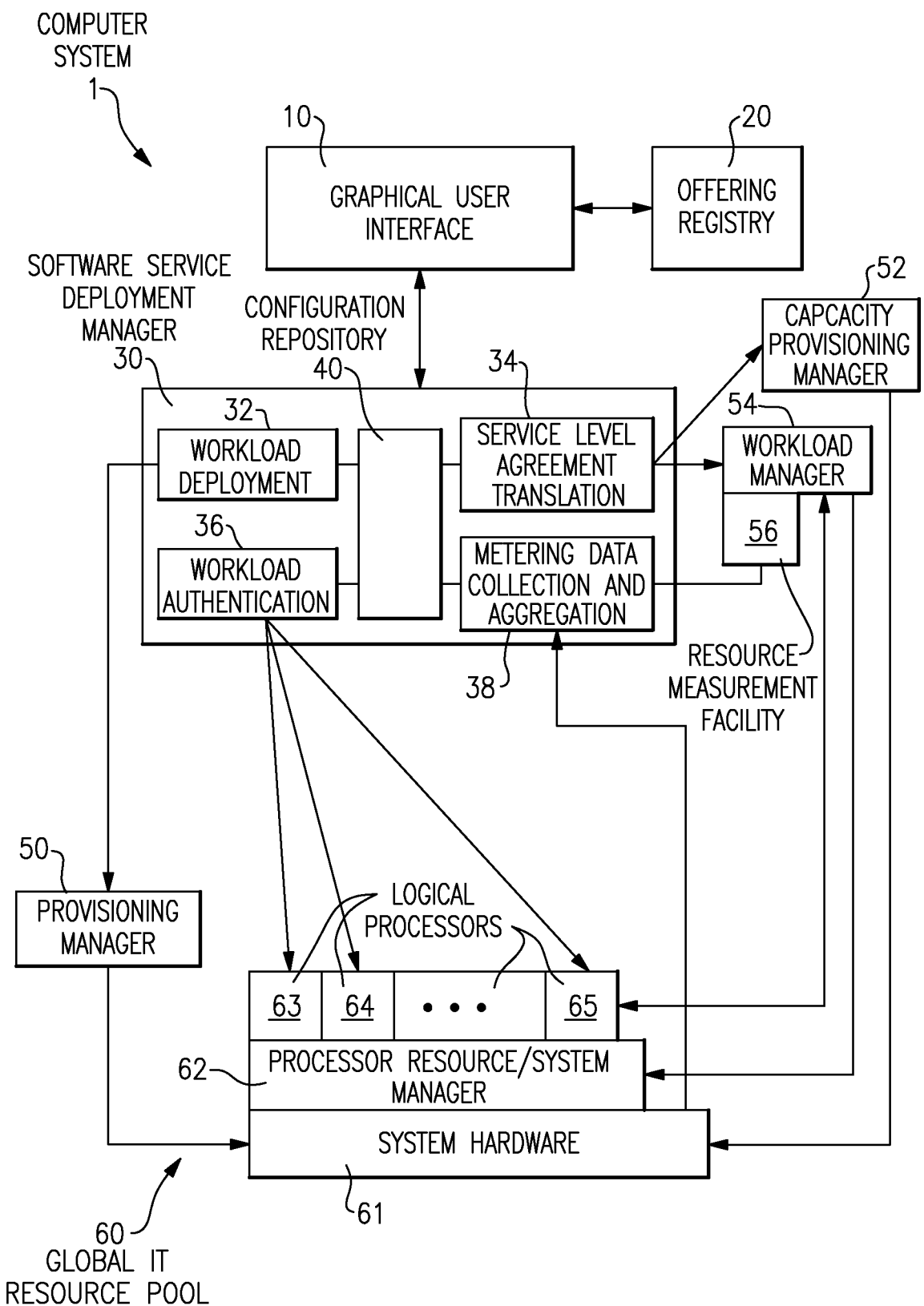
FIG. 1 is a schematic block diagram of an arrangement for deploying a software service, in accordance with an embodiment of the present invention.

FIG. 1 is a schematic block diagram of an arrangement for deploying a software service in accordance with an embodiment of the present invention.

Referring to FIG. 1, a shown computer system 1 comprises a graphical user interface block 10, an offering registry block 20, a software service deployment manager block 30, and a global IT resource pool 60.

The software service deployment manager block 30 is configured to automatically select IT resources on which an Dynamic IT Service will be instantiated, based on workload characteristics and offering Service Level Agreements (SLAs), and to automatically generate deployment characteristics for a provisioning system which instantiates the Dynamic IT Service on the selected IT resources; to integrate existing workload management functionality and define workload management/capacity provisioning control policies automatically; to authenticate instances of Dynamic IT Services and to ensure they run within their authorized limits as defined by the workload characteristics and offering service level agreements; and to meter usage data and aggregate it on Dynamic IT Service granularity to facilitate a real usage based pricing and reporting for the Dynamic IT Service subscriber.

FIG. 1 shows the components of the software service deployment manager block 30 and how they interact with existing systems management functions and the underlying IT resources 60 (e.g. IBM system z with different types of processors). The software service deployment manager block 30 uses a provisioning manager block 50, a capacity provisioning manager block 52, a workload manager block 54 and a resource measurement facility block 56.

The provisioning manager block 50 instantiates (deploys) a Dynamic IT Service on selected target IT resources 60 and terminates a Dynamic IT Service when it is no longer needed. The workload manager block 54 monitors performance of the Dynamic IT Service and checks it against performance goals that are specified in so called policies. If the performance goals are not met or over-fulfilled, it manages the resources available to Dynamic IT Service logical partitions (e.g. varying logical processors 63, 64, 65 on or off, changing logical partitions weights, or dynamically altering channel paths). Changing the resources available to one logical partition or changing processing weights for a logical partition may affect other logical partitions on that central electronic complex (CEC) as well. To enable the workload manager block 54 to achieve the best possible distribution of resources across logical partitions in one central electronic complex, so called logical partition clusters are defined to the workload manager block 54 which represent a collection of all workload manager block 54 managed logical partitions in one central electronic complex. The workload manager block 54 runs within the Dynamic IT Service partition. The resource measurement facility block 56 generates metering data in regular intervals for determining whether the specified performance goals are fulfilled or not. This metering data can also be used for Dynamic IT Service usage metering. The resource measurement facility block 56 runs within the Dynamic IT Service partition. The capacity provisioning manager block 52 increases or decreases the amount of available physical processors on one central electronic complex that can be used by a processor resource/system manager block 62 to instantiate the logical processors for the logical partitions. The capacity provisioning manager block 52 can increase the systems physical processing capacity in those cases where all workload manager block 54 managed logical partitions suffer and resource shifting between logical partitions alone does not help. The capacity provisioning manager block 52 can also add logical processors 63, 64, 65 to partitions. Increasing a systems physical processing capacity or adding logical processors 63, 64, 65 to partitions is typically associated with additional billing by the technology provider. Therefore resource management using the capacity provisioning manager block 52 is also controlled by policies.

With the current invention, the offering of software service as Dynamic IT Service is extended in a way that it still contains the service definition, such as CICS or SAP. Additionally it now contains more general specifications about the type of provisioning and management like software service policies for deployment, management and accounting. These policies are based on best practices and define for instance the type of workload like production, development or test.

The subscriber only chooses the software service using the offering registry block 20, which provides a set of selectable defined software service offerings, and the user interface block 10 to select a defined software service offering from the offering registry block 20. The software service deployment manager 30 as part of the management infrastructure 1 uses the best practice to map software service policies to software and hardware configurations according to best practices. For example, a production workload implies hardware platform System z, five logical partitions, with the database DB2 on z/OS, a high availability setup and an end user response time less than 1 second per transaction. The software service deployment manager block 30 uses the best practice to map software service policies to required user administration accounts to protect the deployed service from being changed or manipulated. For example, to ensure that only production workload is allowed to run on System z platform. The software service deployment manager block 30 uses the best practice to map software service policies to management policies for workload/performance management and high availability management and to required security authentication mechanisms to ensure protection. For example, to ensure that the allowed set of components of a production workload is active on the System z logical partitions. Additionally the software service deployment manager block 30 instantiates, manages and terminates service according to these software policies.

The shown software service deployment manager block 30 comprises a workload deployment block 32 which transforms the workload characteristics into deployment characteristics and selects the target IT resources for the Dynamic IT Service based on system availability, workload characteristics and service level agreements, a service level agreement translation block 34 which translates workload characteristics and offering service level agreements into policies for the workload manager block 54 and the capacity provisioning manager block 52, a workload authentication block 36 which ensures integrity of the Dynamic IT Service image and the corresponding service level agreements, a metering data collection and aggregation block 38 which receives metering data from the resource measurement facility block 56 and also from the system hardware 61 (e.g. processor usage data), and aggregates this data per Dynamic IT Service, and a configuration repository block 40, which holds best practice information about service configuration information, autonomic management policies mapping and/or authentication mechanisms.

Figure 2:
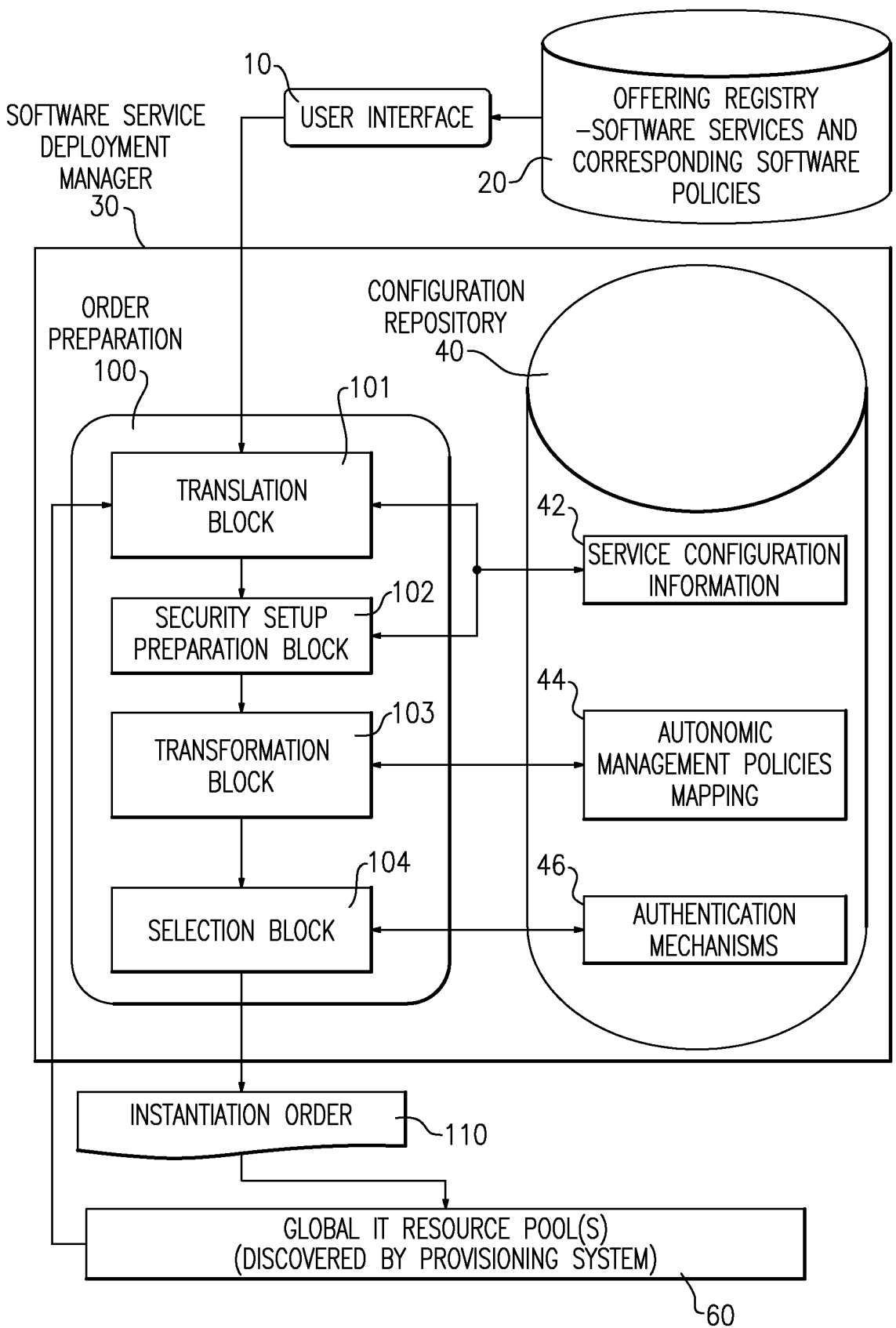
FIG. 2 is a schematic block diagram showing steps and components required to create an instantiation order for a selected software service, in accordance with an embodiment of the present invention.
Figure 3:
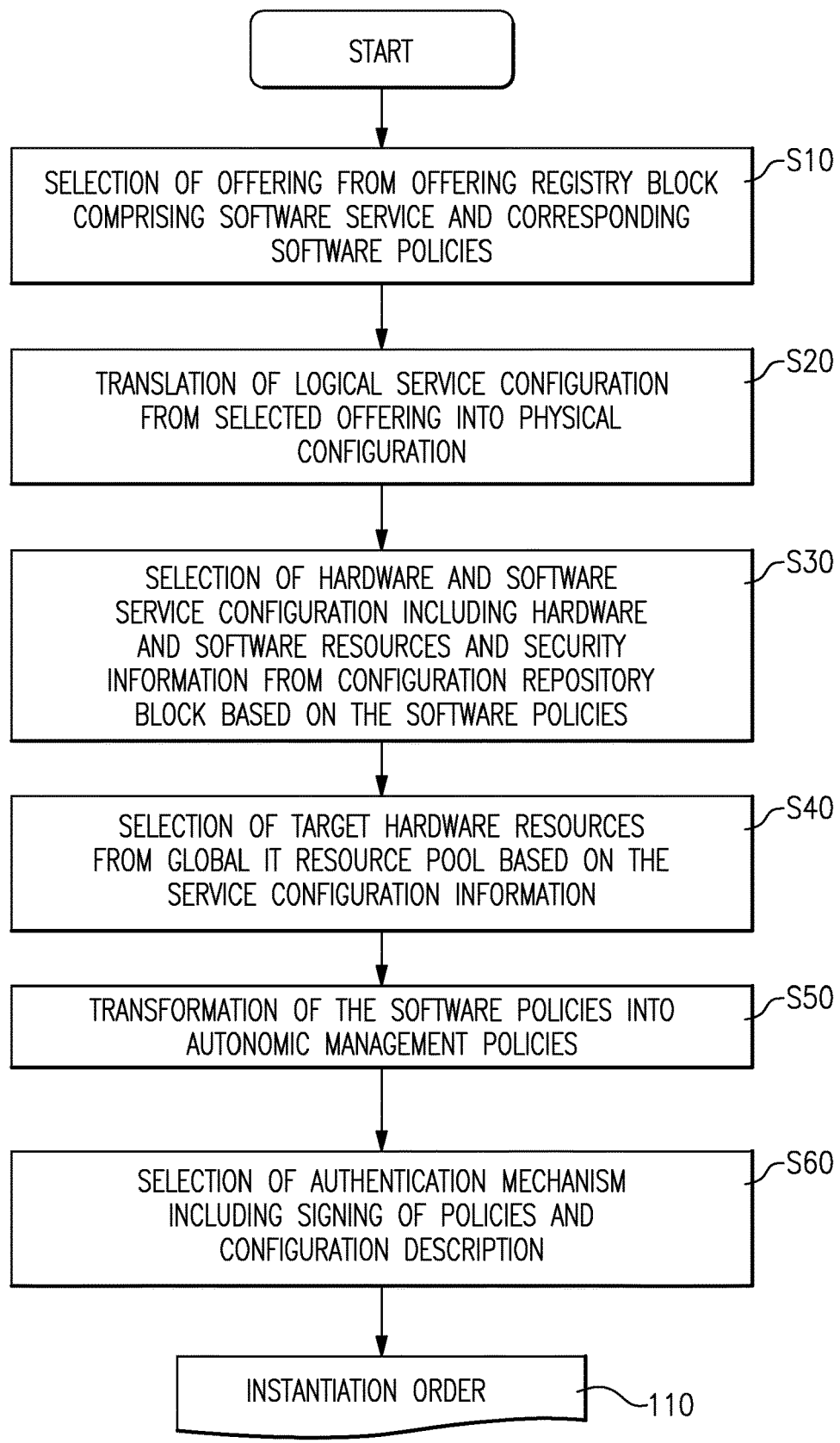
FIG. 3 is a schematic flow chart to create the instantiation order for the selected software service, in accordance with an embodiment of the present invention.

FIG. 2 is a schematic block diagram showing steps and components required to create an instantiation order for a selected software service, in accordance with an embodiment of the present invention, and FIG. 3 is a schematic flow chart to create the instantiation order for the selected software service, in accordance with an embodiment of the present invention.

Referring to FIGS. 2 and 3, a process to create an instantiation order 110 starts in step S10 with a selection of a software service offering from the offering registry 20, wherein the selected software service offering comprises a software service and corresponding software policies. The offering registry 20 contains a finite set of offerings for software services and their deployment and management policies. The subscriber is now using the user interface 10 only to select the offering from the offering registry 20. No additional configuration information or resource selection is necessary. To create the instantiation order 110 the software service deployment manager block 30 performs an order preparation block 100 and uses best practice information on service configuration information 42, on autonomic management policies mapping 44, and on authentication mechanism 46.

After the subscriber has selected the software service and the software policy from the offering, both are transformed into an order that instantiates the service according to the software policy. This is done in several steps. Each step is supported with best practices information 42, 44, 46 from the configuration repository block 40.

In step S20 a translation block 101 is used to translate the logical service configuration information from the offering into the physical configuration. Based on the software policy, the appropriate hardware and software service configuration information 42 is selected from the configuration repository block 40 in step S30. This includes hardware and software resources together with the security information which is prepared by a preparation security setup block 102. The security information is to be deployed to the software service to prevent the service from being manipulated during its lifetime. In step S40 the target hardware resources are selected from the global IT resource pool 60 based on the service configuration information. Once the hardware/software configuration is selected, the autonomic management policies for workload, performance, high availability, capacity management etc. have to be derived from the software policy in step S50 by transformation block 103. This is done by using best practices information about autonomic management policies mapping 44 from the configuration repository block 40. In step S60 a selection block 104 is used to select the appropriate authentication mechanism to prevent the service from being tampered at runtime. This includes the signing of policies and configuration description. After completion of these steps, the instantiation order 110 is ready for execution.

In the shown dynamic infrastructure of the computer system 1, each logical or physical resource is represented as a stateful web service, also called a manageable resource (MR). Each manageable resource consists of a set of attributes together with a set of operations. Manageable resources are used to represent hardware resources, such as server, storage and network, software resources, like operating systems, middleware, database and also software related resources, such as a subscription to a software service, metering and accounting information.

Figure 4:
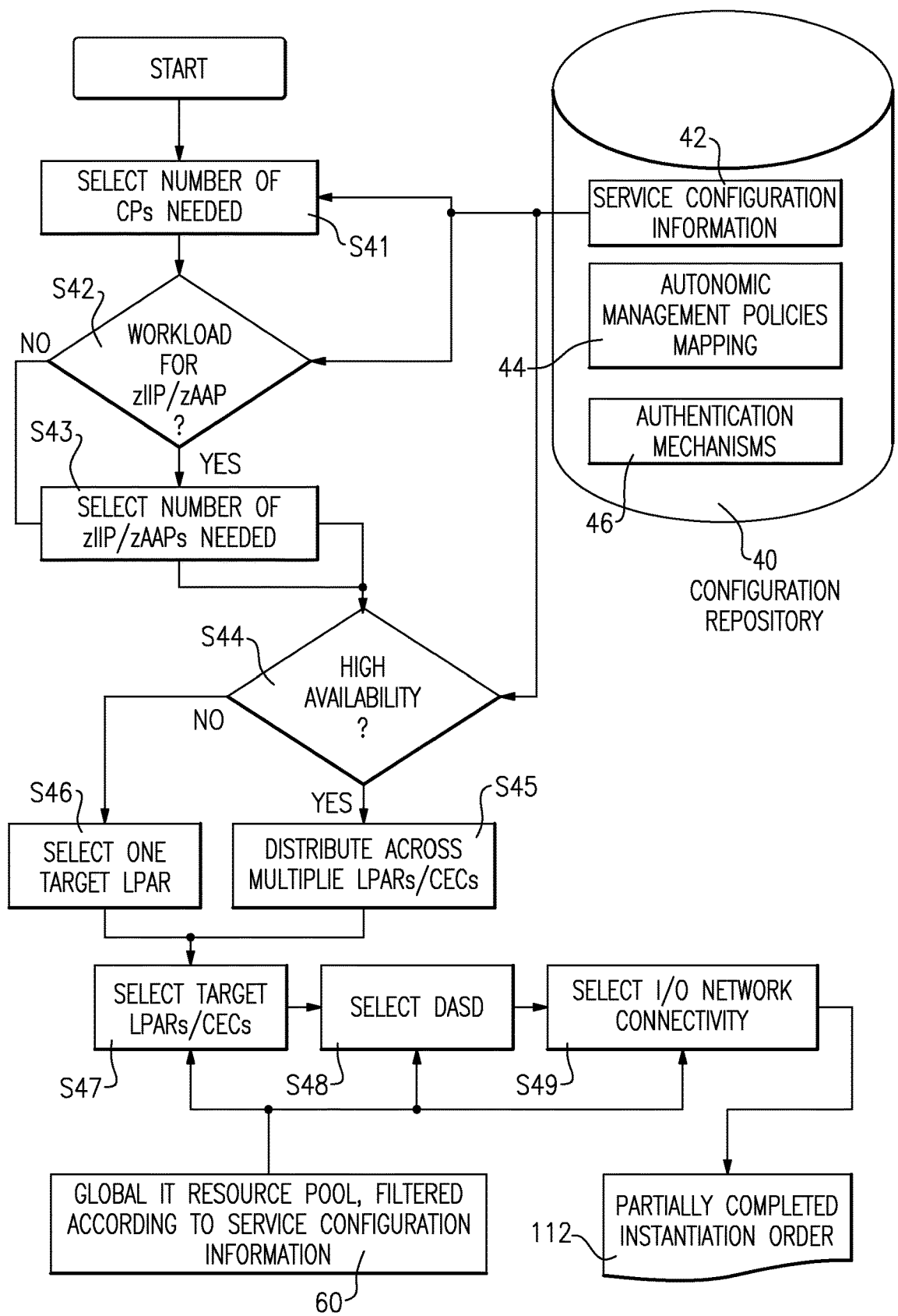
FIG. 4 is a schematic flow chart showing more details for step S40 in FIG. 3, in accordance with an embodiment of the present invention.

FIG. 4 is a schematic flow chart showing more details for step S40 in FIG. 3, in accordance with an embodiment of the present invention. FIG. 4 shows an example how the needed physical configuration for the high level logical configuration described by the offering is selected. The selection method depicted in FIG. 4 refers to complex servers such as the IBM System z models. For simpler servers not all or other steps might be required.

The resources of a System z physical server, also referred to as central electronic complex (CEC), are divided into logical partitions (LPARs). In each logical partition runs an operating system with middleware or applications. A central electronic complex comprises different processor types. Each processor type is priced differently and can only process a particular type of work. For example, zIIP processors 63, 64, 65 can only run operating system and middleware maintenance work. zAAP processors 63, 64, 65 can only run Java programs. General purpose processors (CPs) 63, 64, 65 can run all kind of work. If not enough lower priced zIIP or zAAP processors 63, 64, 65 are available, the work is processed on more expensive general purpose processors 63, 64, 65.

The processing of workload according to given service level agreements (SLAs) in the software policy requires adequate processing, storage, and I/O network resources. Dependent on the required availability level, the service to process the deployed workload has to be instantiated in multiple logical partitions on different central electronic complexes. The configuration repository block 40 contains information about the software components required for the software service as well as the resource requirements and high availability configurations of those software components.

If the software components required for the software service have been determined, the selection of the physical server configurations starts in step S41 with the selection of the number of general purpose processors 63, 64, 65 required to process the amount of workload according to the best practice information 42 in the configuration repository block 40. If a query in step S42 is answered with "yes" a part of the workload can run on zIIP or zAAP processors, and a suitable number of those processors are selected in step S43 according to the amount of workload according to best practices. In the next steps S44 to S46 the logical partition and central electronic complex configuration is selected according to the required high availability of the service. If a query in step S44 is answered with "no" the service is associated with test workload, i.e. low or no high availability is required, and just one logical partition is selected in step S46 to host the software components that provide the service. If the query in step S44 is answered with "yes" the service is associated with production workload, i.e. high availability, and (step S45) several logical partitions are chosen that are distributed over multiple physical servers (e.g. central electronic complexes CECs) to avoid a single point of failure and software components are assigned to those logical partitions according to best practices in the configuration repository block 40.

After the physical configuration requirements are known, the physical resources to instantiate the service are selected from the global IT resource pool 60. Logical partitions and central electronic complexes matching the previously determined requirements are chosen in step S47 as well as hard disks (DASDs) in step S48. Finally, the I/O Network configuration to access the hard disks and to connect the logical partitions is assembled in step S49. Enriched with that information, a partially completed instantiation order 112 is further completed in step S50 of FIG. 3.

In step S50 of FIG. 3 all required system management policies for example for workload and high-availability management are assembled considering the physical and logical configuration compiled in step S40. It depends on the used system management products how such policies have to be assembled and derived from a service level agreement in the software policy. Here some examples.

If a high-availability software such as IBM Tivoli System Automation (TSA) is used, a high-availability policy would for example define on which logical partitions software components should be restarted, if software components providing the service terminate unexpectedly and cannot be restarted in place.

If a workload management software such as IBM Enterprise Workload Manager (EWLM) is used that provides end-to-end management of transactions towards stated response time goals, a workload management policy would contain so-called service classes that describe those goals reflecting the service level agreement from the software policy and rules that classify the workload of the service into those service classes.

Figure 5:
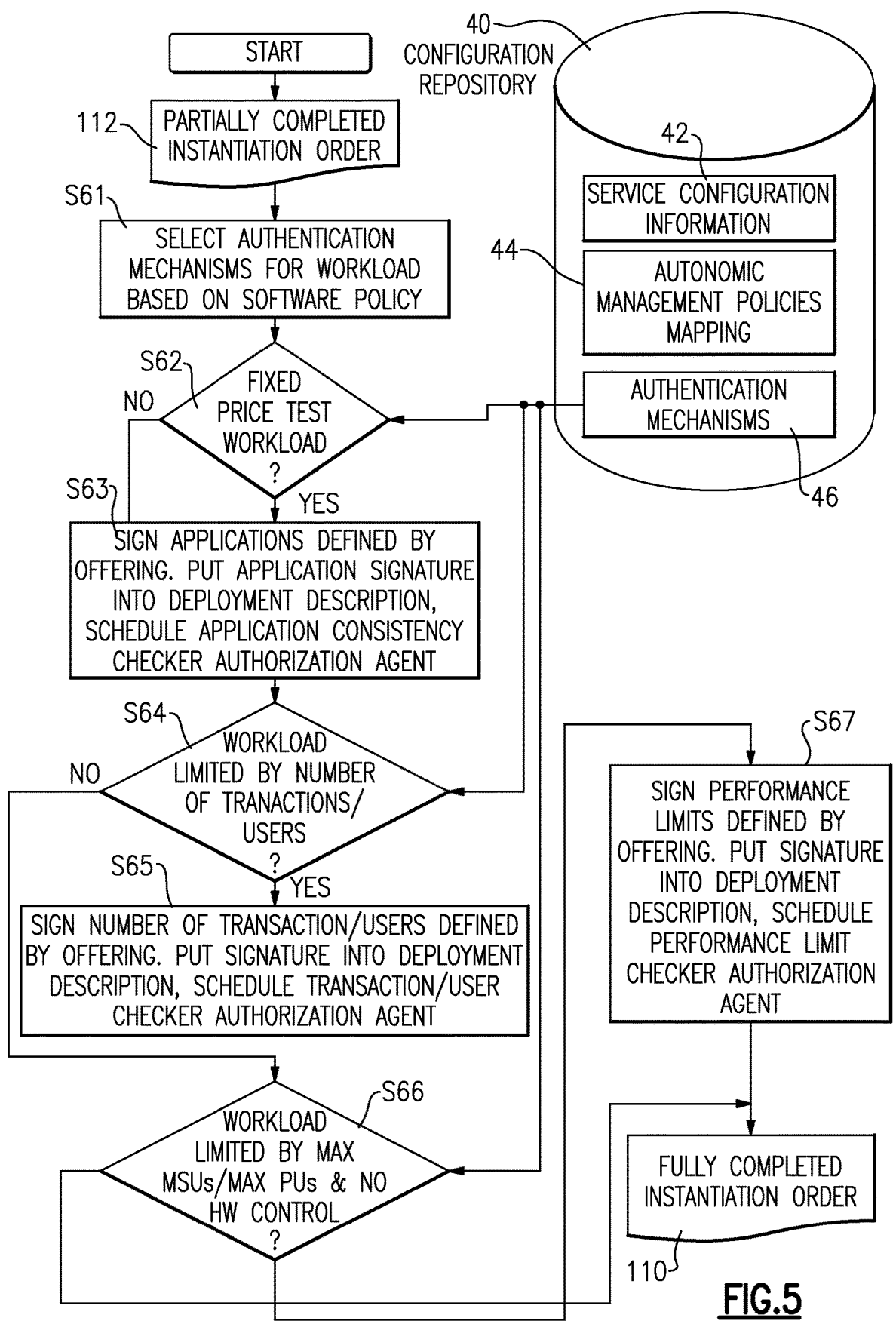
FIG. 5 is a schematic flow chart showing more details for step S60 in FIG. 3, in accordance with an embodiment of the present invention.

FIG. 5 is a schematic flow chart showing more details for step S60 in FIG. 3, in accordance with an embodiment of the present invention. The last step S60 in completing the instantiation order 110 requires selection of the needed authentication/authorization checking mechanisms for the deployed workload based on the software policy as it is defined in the software service offering.

Based on this software policy, a lookup of the needed authorization mechanism in the configuration repository block 40 is done in step S61. For example, if a query of step S62 detects, that the software policy of the software service offering specifies that this is a fixed price test workload, it needs to be ensured in step S63 that no other applications can be deployed on the selected resources than those specified in the offering. This is accomplished in step S63 by generating a signature on the applications defined by the offering. This application signature is put into the deployment description. This makes the signature available during instantiation of the software service and therefore makes it accessible when the software service is running in production mode. In addition, deployment of an application consistency checker agent manageable resource, which can access the signature and check for violations periodically, is scheduled.

Likewise, if a query of step S64 detects, that the software policy specifies that the workload in this software service offering is only limited by the number of transactions or users, in step S65 the number of transactions/users is digitally signed, the signature is put into the deployment description, and a transaction/user checker authorization agent manageable resource is scheduled for deployment.

The same handling can be done for a software service that is limited by available processing power, e.g. by enforcing a performance maximum measured in Million Service Units (MSUs) or by limiting the number of available processors for this workload. A query in step S66 detects, if the software service is limited by available processor power, and in step S67 the performance limits defined by the software service offering are digitally signed, the signature is put into the deployment description, and a performance limit checker authorization agent manageable resource is scheduled for deployment. This is especially important for workloads running in environments where the available processing power can not be limited by existing functionality of the underlying virtualization and hardware layers.

It is obvious that various other limiting factors can be defined in software policies and enforced by signing the authorization limits, deploying the signature together with the deployed workload, and scheduling authorization checker manageable resources that check for violations of these authorization limits during the runtime of the deployed software service in production mode.

At the end of this step S67, a fully completed instantiation order 110 including certificates and topology information for authorization agents is available for execution.

Figure 6:
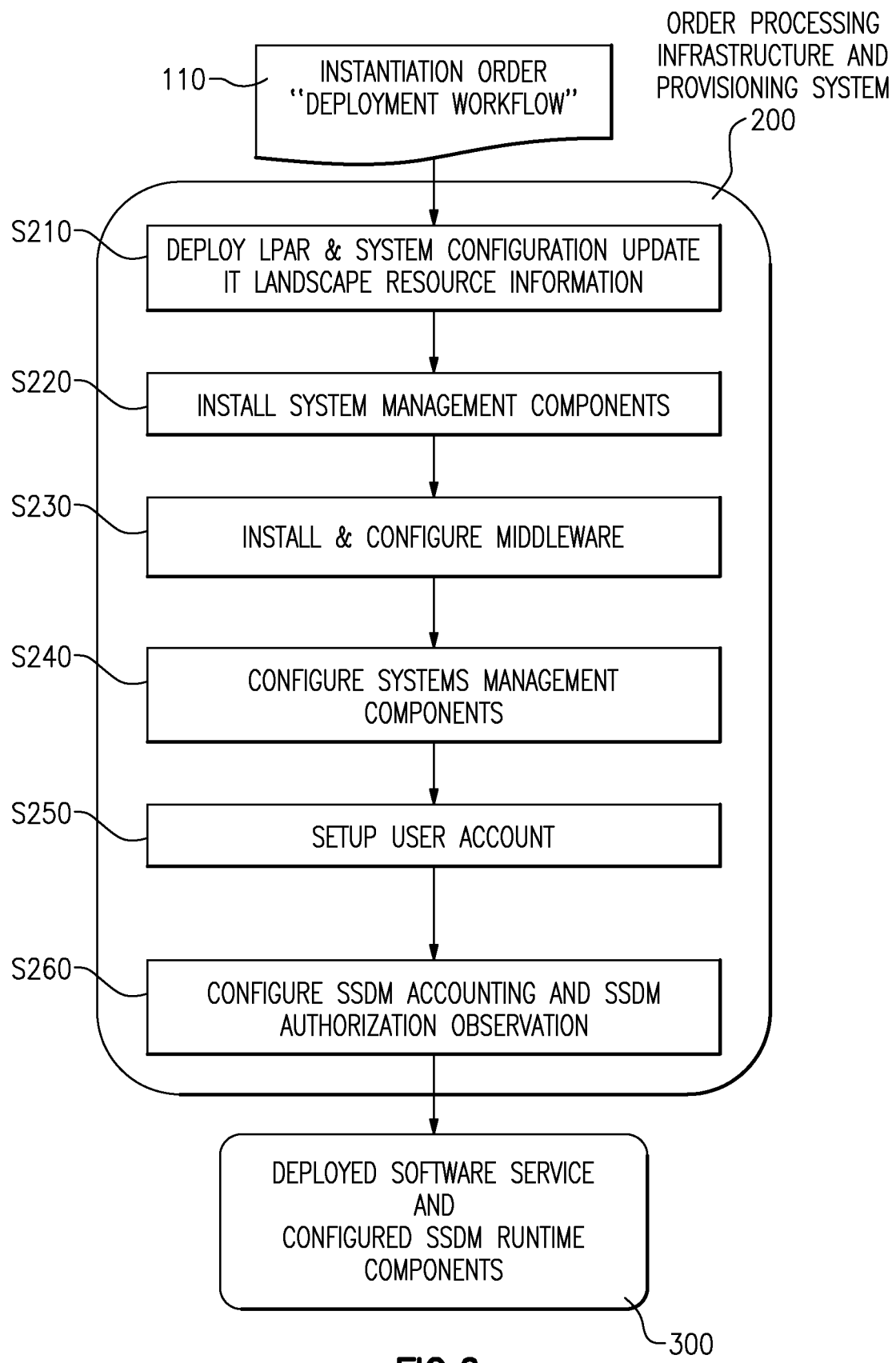
FIG. 6 is a schematic flow chart showing how the instantiation order is executed, in accordance with an embodiment of the present invention.

FIG. 6 is a schematic flow chart showing how the instantiation order 110 is executed in a order processing infrastructure and provisioning system 200 in accordance with an embodiment of the present invention.

Referring to FIG. 6, first in step S210 the logical partitions are instantiated on the chosen physical servers (i.e. central electronic complexes CECs) as described in the instantiation order 110. The operating system images are installed in the logical partitions and the I/O network configuration is deployed. If successfully done, the information in the global IT resource pool 60 is updated. If not already part of the operating system image, the required system management components for workload management, high-availability management, and authorization observation are installed in step S220, such as enterprise workload management agents, system automation agents, and authorization observer agents. After middleware images are installed and configured in step S230 according to the configuration in the instantiation order 110, the system management components are configured in step S240 by activation of the policies in the instantiation order 110 and the user accounts are setup in step S250. Finally, the software service deployment manager 30 accounting and authorization observation runtime components are configured according to the instantiation order 110 information in step S260. Block 300 shows the processing result of the instantiation order 110.

Figure 7:
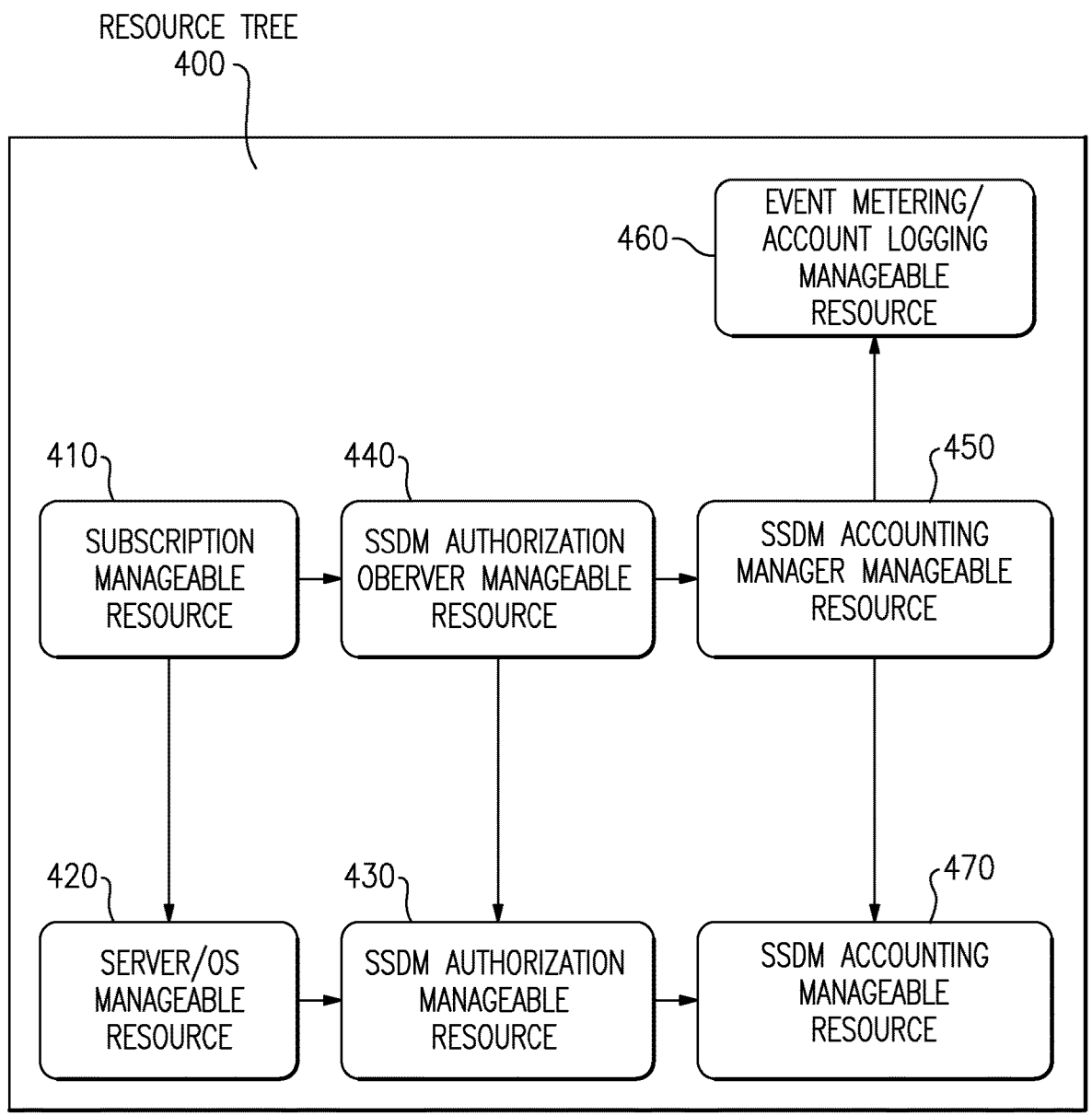
FIG. 7 is a schematic block diagram showing a simplified resource tree for realizing an authorization observation and accounting, in accordance with an embodiment of the present invention.

FIG. 7 is a schematic block diagram showing a simplified resource tree for realizing an authorization observation and accounting, in accordance with an embodiment of the present invention. The shown simplified resource tree 400 with only one server plus the required manageable resources realizes the authorization observation and accounting as part of the deployed software service. Conceptually, both authorization checking and accounting are modeled in a similar way.

A software service is represented as a set of manageable resources 410 to 470 together with the relationships between them. Manageable resources 410 to 470 can also be used to extend the capabilities (attributes and operations) of a given manageable resource 410 to 470. For instance, an operating system manageable resource 420 can be extended with a manageable resource 460 performing metering functionality for the operating system manageable resource 420. Separating both has the advantage that services with and without metering functionality can be instantiated.

Any functionality of a service, such as the service itself, the required set of servers and operating systems and any authorization, metering and accounting are modeled as a set of manageable resources 410 to 470 and relationships and has to be included at the proper place in the resource tree.

Each server/operating system manageable resource 420 is extended with an authorization manageable resource 430 to enable periodic checks on the server/operating system for violations against the policies specified during instantiation of the software service. Each authorization manageable resource 430 is governed by a software service deployment manager observer 440 that in turn periodically collects data from the authorization manageable resources 430, aggregates the data in the software service context and then reports authorization violations and even takes appropriate actions according to the policies defined for the software service.

These actions may vary from degrading performance for the service running on the "violated" or tampered server, over stopping selected processes to even terminating the software service completely. Another possible reaction could be the creation of penalty records that define an additional fee to compensate the violation.

Penalty records are an addition to accounting records. The collection of accounting records is performed similar to authorization checking. An accounting manageable resource 470 is attached to a server/operating system manageable resource 420. The accounting manageable resource 470 collects data from the server/operating system about the number of active processing units, additionally active service units and also about the deployed workload and its measured performance. Similar to the authorization observer 440, an accounting manager 450 is collecting the data for each server, and aggregating the data according to the specified software policies, for instance the set of transactions or supported groups. Finally the event metering/account logging manageable resource 460 is responsible for logging the consolidated accounting records for the deployed software service.

To summarize the advantages of embodiments of the present invention, the introduction of a software service deployment manager with a configuration repository with best practice configurations enables the automatic mapping of high level logical configurations and software goals into physical configuration information, i.e. hardware, software, user accounts, and policies. This optimizes the usage of physical resources (i.e. servers, storage, networks) and reduces the skills needed for IT infrastructure management. The introductions of software service certificates provides for asset protection and security, since instantiated software services cannot be modified unauthorized and software services running on the same server are protected against each other.

The invention can take the form of an entirely hardware embodiment, an entirely software embodiment, or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

While the foregoing has been with reference to particular embodiments of the invention, it will be appreciated by those skilled in the art that changes in these embodiments may be made without departing from the principles and spirit of the invention, the scope of which is defined by the appended claims.

The invention claimed is:

1. A method for deploying a software service, said method comprising:
 receiving a defined software service offering selected from an offering registry, the registry comprising a plurality of defined software service offerings, wherein each of the plurality of defined software service offerings consist of software information;
 generating an instantiation order for deploying the defined software service offering on a corresponding computer system;
 initializing an authentication mechanism for workload based on at least one defined software policy to prevent said selected software service from being manipulated during its lifetime, the authentication mechanism comprising a signature written into a deployment description that is available during instantiation of the defined software service offering, the authentication mechanism further comprising a consistency checker agent that accesses the signature;

wherein each of the plurality of defined software service offerings comprise a software service definition and at least one defined software policy;

analyzing, for the defined software service offering, one or more of a respective software service definition and a respective defined software policy to generate a hardware configuration for the defined software service, a software configuration for the defined software service, and a managing policy for the defined software service; and wherein said instantiation order of said software service for execution on said computer system is created based on said hardware configuration, said software configuration and said managing policy;

wherein the defined software service offering is selected by a subscriber;

wherein said at least one defined software policy comprises logical service configuration information which is translated in a physical service configuration information for said software service;

wherein said physical service configuration information comprises information selected from the group consisting of hardware resource information, software resource information, security information, and a combination thereof;

wherein hardware resource information comprises information about hardware components in a global resource pool, wherein said resource pool comprises at least one selected from the group consisting of a central electronic complex, a logical partition, a hard disk, an I/O-Network, two different processor types, and a combination thereof, wherein each of said processor type is priced differently and processes only one particular type of work;

determining a configuration of at least one selected from the group consisting of said central electronic complex, said logical partition, and a combination thereof, according to a required high availability;

wherein only one logical partition is selected, if low or no high availability is required; and wherein several logical partitions distributed over multiple central electronic complexes are selected, if high availability is required.

2. The method of claim 1, wherein software resource information comprises information about software components required for each of said defined software services, and resource requirements or high availability configuration of those software components.

3. The method of claim 1, further comprising: determining software components for said selected software service, and selecting target hardware components from said global resource pool for said selected software based on said service configuration information.

4. The method of claim 3, wherein number and type of selected processors depend on an amount or type of workload to process.

5. The method according to claim 1, further comprising: transforming said software policies into autonomic management policies.

6. The method according to claim 1, wherein said at least one logical partition is instantiated on said at least one central electronic complex when said instantiation order of said software service is executed on said computer system, wherein operating system images are installed in said at least one logical partition, said I/O-Network configuration is deployed, an information of said global resource pool is updated and corresponding system management components are installed, wherein said corresponding system management comprises at least one component selected from the group consisting of a workload management component, a high-availability management component, an authorization observation component, and a combination thereof.

7. The method according to claim 1, further comprising: configuring accounting and authorization observation runtime components according to said instantiation order.

* * * * *